July 23, 1963   F. J. GRADISHAR ET AL   3,098,716
RECOVERY OF BROMINE FROM SOLUTIONS THEREOF
Filed Aug. 31, 1960
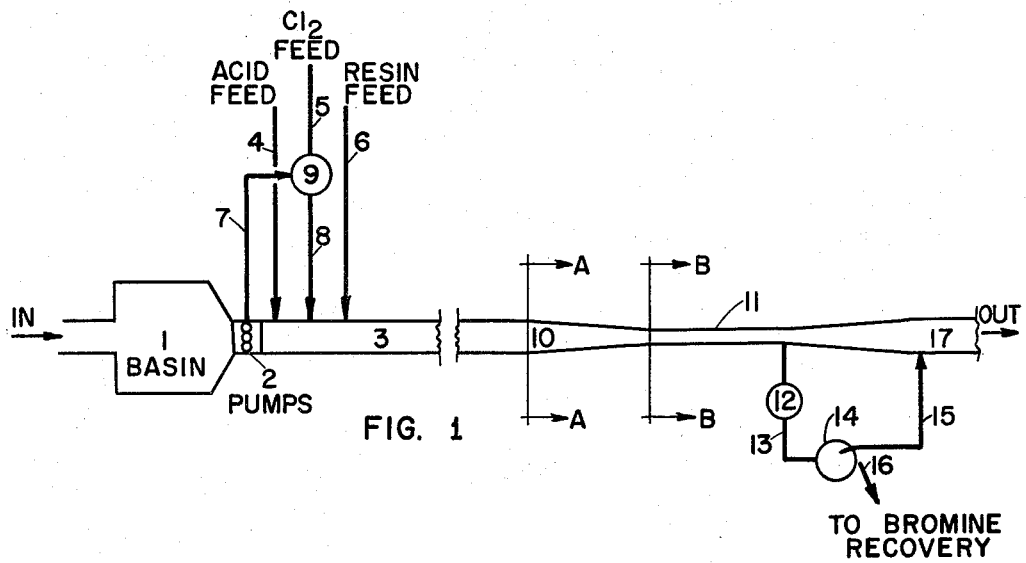
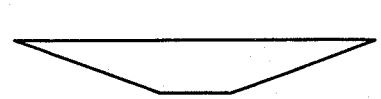
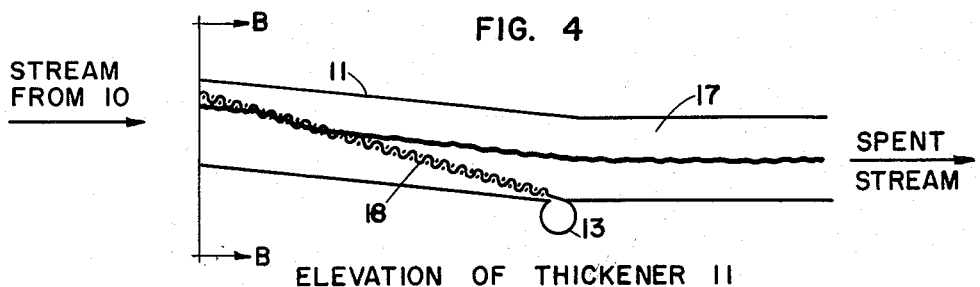
INVENTORS
FREDERICK JOHN GRADISHAR
ROWLAND FRANK HEIN
BY *[signature]*
ATTORNEY

United States Patent Office 3,098,716
Patented July 23, 1963

3,098,716
RECOVERY OF BROMINE FROM SOLUTIONS THEREOF
Frederick John Gradishar and Rowland Frank Hein, Wilmington, Del., assignors to E. I. du Pont de Nemours and Company, Wilmington, Del., a corporation of Delaware
Filed Aug. 31, 1960, Ser. No. 53,262
4 Claims. (Cl. 23—217)

This invention is directed to the adsorption of bromine on strong base anion exchange resins. In particular, the present invention relates to the recovery of bromine from industrially important brines. According to this invention, the bromine solution and the resin are contacted cocurrently rather than counter currently (as in conventional bed operation). An important aspect of the invention is the recovery of bromine from sea water by acidifying the solution and oxidizing the bromide content thereof with excess chlorine, cocurrently contacting in a continuous manner the acidified and oxidized brine with a strong base anion exchange resin, which resin adsorbs the bromine in the form of polybromohalide, followed by removing the bromine from the resin by appropriate means.

It has been shown that when saturated bromine water is passed through a column of a strong base anion exchange resin in the chloride or bromide form, bromine is adsorbed by the resin. The resin's fixed cationic sites (quaternary ammonium groups) supposedly hold the bromine as polybromohalide anions, so that in effect the original anions of the resin have been exchanged for polyhalide ions.

For ion exchange, column (or bed) operation is generally considered more efficient than batchwise. In bed operation, the ion exchanger is continuously contacting fresh, i.e., ion-rich solution, whereas in the batch method, all the resin is in contact with all the solution being treated and thus is in equilibrium with the ion-depleted solution. Because of the countercurrent contact it provides, bed operation should be particularly suited for treating dilute solutions. Bed operation, however, entails many difficulties on a commercial scale. Most notable are: The need for careful adjustment of the bed and uniform distribution of the solution onto the surface of and through the bed; the development of pressure drops through the bed; and the need for backwashing (bed cleansing) facilities. These become magnified when dilute raw solutions are processed because of the large volumes that pass through the relatively small volume of exchanger and the fact that raw waters contain significant amounts of solid matter. Non-uniform distribution of the influent solution over the bed may lead to premature breakthroughs and excessive leakage, which means decreased exchange capacity. The bed's resistance to the flow of solution (pressure drop) must be overcome by expenditure of energy i.e. with pumps. Solid matter from the solution building up on the bed as a clogging dense mat has to be periodically removed by shutting down and backwashing. Thus in bed operations, costs of installation, operation, and maintenance tend to be rather high, the more so the more dilute and raw the solution to be treated.

It is, therefore, an object of the present invention to provide a novel method for adsorbing bromine values from dilute solutions thereof on strong anion exchange resins. A further object of this invention is to provide such a novel process for recovering bromine values whereby recoveries of bromine are achieved in an amount equal to or better than obtainable by the countercurrent bed process. A still further object is to provide a novel process for recovering bromine values from dilute solutions thereof, said process requiring a significantly less expenditure of energy and resulting in a reduced fouling of the resin by foreign solid matter of the solution being treated.

These and other objects will become apparent in the following description and claims.

More specifically, the present invention is directed to a process for removing molecular bromine values from dilute aqueous solution thereof, which process comprises cocurrently contacting a current of said solution with a strong base anion exchange resin, then separating the bromine-laden resin from the residual brine.

The process of this invention is adapted for treating dilute solutions containing bromine concentrations on the order of 10 to 1000 p.p.m. A particular embodiment is the recovery of bromine from a natural bromide-containing chloride brine such as sea water by acidifying the brine and oxidizing the bromide content thereof to the molecular form (as by adding chlorine), and cocurrently mixing the thus treated brine with from about 0.05 to 1 volume percent (preferably 0.1–0.5 vol. percent) of a strong base anion exchange resin having affinity for bromine, whereby to remove bromine from the brine, followed by separating the bromine-laden resin from the residual water phase by filtration, decantation, centrifugation or the like.

Solutions of the halogens in water are normally acidic. For the purpose of this invention, the pH of the aqueous phase in contact with the resin will be less than 7, and preferably below 5, and in particular in the range 3–4. Where needed, a sufficiently strong acid such as hydrochloric, hydrobromic, sulfuric, phosphoric, nitric, trifluoroacetic, and the like can be added to achieve and maintain the desired pH level; pH's below 2–3 appear unnecessary.

Bromine source solutions wherein the bromine is in the bromide form are put in the proper form for adsorption by oxidation of the bromide to bromine. Chlorine is the preferred oxidant, as represented in the following equation.

(1) 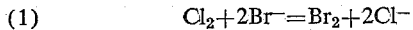 $Cl_2 + 2Br^- = Br_2 + 2Cl^-$

As indicated by this Equation 1, the moles of chlorine as oxidant should be at least equal to the moles of bromine it is desired to recover. However, it is preferred, when chloride brines are treated, that the chlorine oxidant be used in excess. Normally, the excess chlorine will amount to at least about 0.2 mole per mole of bromine and usually not more than about 2 moles per mole of bromine. Preferably, the ratio will be at least about 0.5 to 1 and in particular about 1 to 1. In other words, the embodiment of the invention wherein bromine is recovered from a bromide-containing chloride brine such as sea water or the like, the amount of chlorine used as oxidant will normally correspond to from 1.2 to 3 atoms (theories) of chlorine per bromide ion, which corresponds to an excess of 0.2 to 2 theories of chlorine over the stoichiometric amount required by Equation 1. Larger excesses of chlorine may be used but are unnecessary. It should be understood that the chlorine referred to herein as being present along with bromine in the solution is the calculated excess over the stoichiometric oxidizing amount of Equation 1.

The bromine source solution may be a natural or synthetic brine. Natural brines contain bromine as bromide ranging from about 50 to 1000 p.p.m. but may have as high as 6000–7000 p.p.m. These brines have high chloride contents, with the ratio of chloride to bromide ranging broadly from about 20:1 to about 500:1, usually at least 100:1.

The bromine source solution for the present invention may also be a synthetic bromide-containing brine or an aqueous bromine-containing waste stream.

Suitable and available strong base anion exchange resins are of the quaternary ammonium type. They are essentially long chain-like and web-like water-insoluble molecules characterized by having quaternary ammonium groups as the fixed, i.e., non-exchangeable cationic sites. Associated with these sites are anions (which make the resin electrically neutral and which are the exchangeable constituents) that may be varied as desired by proper treatment as is well known in the art. Typical resins are based on the polystyrene backbone; divinylbenzenes cross-linking units provide the necessary degree of dimensional stability and water-insolubility to the polymer, while groups of the formula, $$-\text{alkylene}-\overset{+}{\text{N}}R_1R_2R_3$$

provide the positively charged sites. $R_1$, $R_2$ and $R_3$ are usually alkyl such as methyl, ethyl and the like, but may be alkylol such as hydroxyethyl, and may be joined to constitute along with the nitrogen atom a heterocyclic radical such as methylpiperidinium or pyridinium. Resins such as these may be prepared by chloromethylating a polystyrene-divinylbenzene copolymer, then reacting with the appropriate tertiary amine.

Specific resins that may be employed in the present invention are described in U.S. Patent 2,591,573. Other quaternary ammonium type resins that may be employed are disclosed by U.S. Patents 2,630,427 and 2,597,494 and U.S. Patent 2,597,440. A specific example is the strong base anion exchange resin prepared according to the Examples (A—B—C) of U.S. Patent 2,591,573. The hydroxide form of this resin is converted to the chloride form, for example, by flowing sea water through it. Also, it is understood that commercially available Amberlite IRA 400 listed in the following table is of the class of strong base anion exchange resins described in said U.S. Patent 2,591,573. In the present process, satisfactory results are obtained with the resins of the patent and with the commercial articles Amberlite IRA 400. The resins described in U.S. Patent 2,900,352 can also be used; for example, the resin prepared according to Example 5 of this patent. Also, the resins described broadly and as specifically shown in Example 2 in U.S. Patent 2,614,099 may be used in this process.

Many suitable resins are available commercially as follows. The Type I resins are understood to have

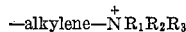

groups, the Type II resins to contain

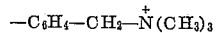

groups, and the pyridine type to be used on pyridine as the source of the cationic sites.

STRONG BASE ANION EXCHANGE RESINS

STRONG BASE ANION EXCHANGE RESINS

| Commercial Name | Source | Quaternary Ammonium Type |
|---|---|---|
| Duolite A-101 | Chemical Process Co. of Redwood City, California. | I |
| Duolite A-101 D |  | I |
| Retardion 11A8 |  | I |
| Dowex 2 | Dow Chemical Co. of Midland, Michigan. | II |
| Dowex 21K |  | I |
| Dowex 1 |  | I |
| Dowex 11 |  | I |
| Amberlite IRA 400 | Rohm and Haas Co. of Phila., Pa. | I |
| Amberlite IRA 401 |  | I |
| Amberlite IRA 402 |  | I |
| Amberlite IRA 410 |  | II |
| Amberlite IRA 411 |  | II |
| Permutit S-1 | The Permutit Co. of New York, New York. | I |
| Permutit SK |  | Pyridine |

The resins utilized according to the present novel process are normally obtained as granules or uniform beads, usually in the hydroxide or chloride form and in particle sizes of from about 16 to 400 mesh. The chloride form is more commonly available; however, any form of the resin may be employed, so long as the anionic component is exchangeable by chloride and bromide ions. In addition to the chloride and hydroxide forms, the acetate, nitrate, bisulfate and sulfate, phosphate, fluoride, and the like forms may be used. Treating any of the above with bromine in sodium chloride brine, for example, results in the anions of the resin being displaced by a bromine-containing polyhalide ion as more fully discussed below. Mixtures of these resins may be used in practicing the present invention.

Broadly from about 0.5-10 volumes of resin, preferably 1-5 volumes, is mixed with 1000 volumes of the bromine source solution, e.g., the acidified and chlorinated bromide brine, and the mixture held for the desired length of time before the bromine-laden resin is separated from the water phase. The sea water (or any bromide solution as herein described, the acidifying acid, the chlorine oxidant for bromide, and the resin can be added separately or together in any order, including pretreatment of the resin with chlorine. The present cocurrent method of operation may be carried out in conventional equipment at ordinary temperatures and pressures. The temperature may range upwards from just above the freezing point of the solution to be treated, but is preferably kept below about 60° C. to minimize halogen attack on the resin itself.

Conveniently the resin is handled as a slurry in sea water which can be pumped into a mixing zone where, for example, it is mixed with separate streams of acidified sea water and chlorine. The latter as gas can be blown into the suspension of resin-sea water to effect mixing as well as to oxidize the bromide to bromine. In a preferred embodiment, the resin and the acidified and chlorinated sea water are continuously moved along a channel (canal, ditch, trough, or pipe), then separated continuously as by screening. The channel can be pitched such that the resin-water phase mixture flows under gravity to the separation zone. The resin can be moved along mechanically by mixing and conveying means, with a screw conveyor for example, or carried by the flow of the water phase. Suitable resin transport can be obtained by adjusting the dimensions of the channel and the flow of the water phase along it. While agitation is not necessary for operability, it may be desirable as a means of keeping the resin granules suspended in and moving along with the bromine source solution to the separation zone. Duration of contact varies, depending on such factors as resin particle size and porosity, but ordinarily is of the order of 5-15 minutes with 100-200 mesh sizes of the available commercial resins and 10-30 minutes with the 20-50 mesh resins.

The velocity of flow in the channel may be made sufficient in itself to prevent settling of the solids before reaching the separation zone. For example, with 50-100 mesh resin in a straight channel a velocity of 2-10 feet will ordinarily maintain the resin suspended. At lower velocities auxiliary agitation may be required.

The resin is recovered from the water phase by settling, decanting, screening, or filtering, according to known principles and techniques. For example, the resin-water suspension may first be thickened by flowing past a coarse screen arranged such that the water phase passes through under a hydraulic head, leaving a relatively concentrated slurry of resin which then requires a smaller filter or settling chamber for final separation.

The thus treated and separated water phase from any of the above operations may still contain positive bromine values—though generally this will be less than 20 p.p.m. Br—and if desired may again be treated according to the method of the invention. For example, the water phase from the cocurrent process can be treated with another batch of resin, and the resin recovered from this second stage can be used as such to remove bromine from a fresh supply of acidified and chlorinated sea water. While such second staging is often useful to scavenge low bromine values, further staging is ordinarily not needed.

Over-all, the total power input for moving the resin water phase along the channel to the separation zone and for effecting separation is a small fraction of the power needed to lift the same volume of water solution to an adequately sized column of the same resin and to overcome the pressure drop through the bed. Also the recoveries of bromine by the present novel cocurrent method are as good or better than by the bed process, reaching 85–95% of theoretical in less time at less expenditure of energy.

The bromine can be recovered from the resin in a variety of ways, including extraction, steam distillation, chemical reaction to convert the bromine into recoverable inorganic bromides and/or organic bromo compounds. The bromine is conveniently recovered from the resin by reduction to bromide and removal as a concentrated aqueous phase. When a mole of chlorine is present along with each mole of bromine in the adsorption process, as when 100% excess $Cl_2$ is used as oxidant for sea water, the chlorine is adsorbed in about equal proportion with the bromine. Reduction of the adsorbed bromine and chlorine with aqueous sulfur dioxide produces a mixture of hydrochloric, hydrobromic and sulfuric acids, in accordance with the following equation:

(2) 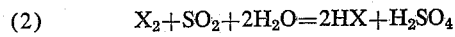$$X_2 + SO_2 + 2H_2O = 2HX + H_2SO_4$$

where $X_2$=bromine, chlorine or mixtures or interhalogen compounds thereof.

The bromine value of this relatively concentrated acid solution obtained in accordance with Equation 2 is readily recovered by reoxidation with chlorine and stripping by known means as in the conventional air blowing or steaming processes. The recovered acid of Equation 2 is used to acidify the incoming sea water.

Normally the strong base anion exchange resins, as prepared by the known methods and obtained commercially, are in part reactive towards free bromine and chlorine, and at first irreversibly consume some of this halogen in undergoing substitution or addition reactions. To obtain consistent adsorption results it may be necessary to condition the resin by pretreatment with bromine or chlorine or both, in effect to "burn away" (or halogenate) labile (or reactive) sites and produce a resin providing consistently high yields of recoverable bromine by the adsorption process. Conveniently the resin, say the commercial product in suitable, e.g. chloride form, is subjected to the over-all cycle of being contacted with the bromine source solution in final form, e.g. acidified and chlorinated sea water to adsorb bromine, then treated with a reducing agent, e.g. $SO_2$ in the presence of water to reduce and remove bromine, then washed with brine to complete the elution step. The cycle is repeated until reproducible results are obtained in terms of bromine recoveries. Occasional washing with an organic solvent e.g. acetone helps keep the resin clean of water-insoluble but solvent-soluble organic matter that may contribute to clogging of the resin pores.

The invention may be better understood with reference to the following representative example and accompanying descriptions of materials and cocurrent channel process equipment.

*Example*

A strong base anion exchange resin in the chloride form is prepared according to Example (A—B—C) of U.S. Patent 2,591,573. As prepared, this resin has a mesh size of 20–50 and a moisture content of about 36%; the capacity for adsorbing chloride ion from NaCl solution is 1.2 meq./ml. on a wet (36% $H_2O$) basis and 3.2 meq./g. after drying at 105° C. to constant weight. The resin is preconditioned by subjecting it to a treatment cycle consisting of (a) contact with acidified and chlorinated sea water (to adsorb bromine), (b) reduction of the adsorbed bromine with $SO_2$ and water, and (c) washing with NaCl brine, the cycle being repeated 6 to 10 times or until acceptable material balances are obtained. The preconditioned resin may be used indefinitely.

The equipment, as outlined in FIGURE 1, consists of a sea water storage and settling basin 1 (with a canal for receiving water from the sea). Basin 1 opens into channel 3 via pump house 2. Feed lines 4, 5 and 6, at the pump end of the channel, admit acid, chlorine and resin, respectively, for mixing with the incoming sea water. Before entering channel 3, chlorine ($Cl_2$) from 5 passes into dissolver 9 where it mixes with a by-pass stream of water 7 from pump house 2, forming solution 8, which enters channel 3. Addition of and adjustment of the acidity and chlorination levels is automatically controlled by mixing valves. The addition of acid is actuated via a glass calomel pH electrode monitoring the sea water stream. Similarly a calibrated E.M.F. cell containing platinum and calomel electrodes monitors the chlorine content by signaling a control mechanism governing the $Cl_2$ feed. The amount of oxidant halogen in the feed is checked periodically by sampling and known methods of chemical analysis. Resin is metered into 3 with a screw-, star-, vibratory- or gravimetric feeder. Channel 3 (more fully described below) leads through transition section 10 to thickening zone 11 (for concentrating the resin-sea water slurry). Conduit 13 conveys, by means of pump 12, the concentrated resin-sea water slurry to filter 14, from which exits spent sea water at 15. Spent sea water (i.e., resin-free sea water) leaves zone 11 through a transition zone to the exit canal, 17. The dewatered resin is removed from the filter at 16.

Channel 3, transition section 10 and thickening zone 11 are lined with asphalt sheet membrane. All conduits, pumps and filters for conveying acidified and chlorinated sea water are lined with rubber.

Basin 1 provides at least ½ hour's retention time, and the average flow velocity is about 0.25 foot/sec. to pump house 2. Channel 3 is 9 ft. deep, 10 ft. wide at the bottom, with sides sloping 2.5:1 to a width 55 ft. at the top (section A—A, FIGURE 2); it is 4500 ft. long and is pitched (drops 1.8 ft. in 4500 ft.) so that there is an average flow rate of 5 ft./sec. (from an initial height of 7 ft.) which corresponds to a residence time of 15 min. in the 4500-ft. channel.

In operation, sea water which normally has 65 p.p.m. bromine as bromide and 18,980 p.p.m. chlorine as chloride, is allowed to settle in basin 1. It is pumped via 2 at the rate of 429,000 gallons per min. to channel 3. Simultaneously (a) 15,340 lbs./hr. of sulfuric acid and 11,092 lbs./hr. of hydrochloric acid in 887,000 lbs. of sea water are added through 4, (b) 12,698 lbs./hr. of $Cl_2$ as a saturated solution in 1,848,000 lbs. of sea water are fed to the main stream through 8, and (c) 296,000 lbs./hr. of 50–100 mesh resin are added through 6 to produce a 0.2% slurry having pH 3–3.5 and containing 2 atoms of chlorine per bromide ion in the total sea water charge.

The thus acidified and chlorinated sea water-resin slurry from an initial 7 ft. depth flows in turbulent flow along channel 3 at about 5 ft./sec. to the transition section 10 (bounded by A—A and B—B in FIGURE 1) which is 75 ft. long and has a cross-sectional area such that the velocity of the flowing stream is increased to 10–15 ft./sec. The moving stream then enters the thickening zone 11, which is an extention of 3 and 10, is 150 ft. long, 24 ft. wide and 9 ft. deep. Transition section 10 has the same pitch as channel 3; thickener 11 however drops another 1.6 ft. in sloping its 150 ft. from the end of 10.

Entering 11, the moving stream encounters screen 18 (FIGURE 3). Screen 18 is about 150 ft. long and is placed across the width of 11 and arranged nearly parallel to the flow of the stream, as illustrated in the elevation view (FIGURE 4) of thickener 11 in FIGURE 1. The water flows through the screen and the resin remains on the lower side. Formation of a filter cake is prevented by the flow of water essentially parallel to the screen. The over-all dimensions of and positioning of the screen are such as to maintain the 10–15 ft./sec. flow rate and to provide a filtration rate of about 400 to 800 g.p.m./ft.$^2$ when the static head is 1 ft. of water. The resin accumulates beneath the screen and when the slurry has thickened to 15 wt. percent is conveyed through conduit 13 aided by pump 12 to rotary vacuum filter 14 where the resin is separated from the gross water phase, the separated water leaving at 15 which returns the water to exit channel 17 on the downstream side of screen 18.

The dewatered resin is transported via 16 to the bromine recovery area (not shown). For example, to recover the bromine, the bromine-laden resin is transported to a column, is covered with sea water, and sulfur dioxide is then passed in, up through the bottom of the column in a vigorous stream to effect good mixing, to reduce the adsorbed halogens completely. The resultant aqueous phase is drained and reserved, and the column of resin washed with NaCl brine to displace substantially all the bromide which is obtained as a concentrated aqueous solution.

The spent sea water in 17 contains on the average about 20 p.p.m. bromine. It can be retreated, in a second channel substantially identical to the above, with another batch of the resin at the same rate as above, to reduce the residual bromine content to 6 p.p.m. and to yield a partially loaded resin which can be recycled for use in the above example. In this case, the thickened slurry of partially loaded resin removed via 13 can be pumped (12) to the head of the first channel for use there. In other words, the resin admitted through 6 to 3 may be fresh (i.e., substantially free of adsorbed bromine) or partially loaded with bromine, and the over-all process can be conducted with one or more channels as desired.

The yield of bromine from sea water is about 70% after the first stage and about 91% after the second stage with the above materials under the conditions described. Increasing the ratio of resin to sea water leads to increased yields of adsorbed bromine. Similar results are obtained using any of the resins referred to earlier by example and listed in the table of available resins.

It should be apparent that the design of the described equipment and the arrangement of units in the channel process can be varied widely. For example, screen 18 heretofore described is a 150-mesh plain weave screen of titanium, but other materials, e.g., polyvinyl chloride, polyethylene, nickel, and its alloys (e.g., Hastelloy C) may be used. Also 18 may be a slotted flat plate equivalent to a 120-mesh screen (U.S. Standard Screen size), the slots being triangular in section with the narrow opening on the slurry side of the plate. Also, instead of the screen sloping down to the bottom of the channel in 11, the bottom of 11 can be sloped up to it.

A back wash device can be installed in the thickener to remove occasional accumulations of broken resin particles and fine dirt that may catch on the screen and reduce its performance. A suitable device is one providing a multiple of spray jets which can be moved past the screen. For example, a wheeled frame rides on the sides of the channel and over the screen of section 11; pipe headers and laterals are attached every 4 to 10 feet to the underside of the carriage. On the bottom of the laterals are spray nozzles whose spray cones overlap so that a solid spray wall can be directed at the backside of the screen. The carriage, motor-driven, can move to and fro over the screen, and when it is desired to back wash the screen, water for the back washing device is picked up on the backside of the screen and pumped through flexible hose to the header, and out the laterals, to the screen. The jet velocity exceeds and preferably is about 5 times the velocity (2.5–5 ft./sec.) of the water passing through the screen, so that the screen may be back washed without interrupting the operation of the channel.

Any of the heretofore-described strong base anion exchange resins may be substituted in the preceding example to give essentially the same results. Also, the pH range of the acidified bromine solution may be varied as described and the amount of chlorine utilized may be varied to give substantially the same results as long as at least a stoichiometric amount of chlorine is present to oxidize the bromide content of the acidified bromine solution. These variations and modifications may be made by one skilled in the art and are contemplated as within the scope of the present invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for removing bromine from a dilute bromide-containing chloride brine wherein the Cl/Br ratio is within the range 20/1 to 500/1 which comprises acidifying said brine, oxidizing the bromide content thereof to bromine, and cocurrently and continuously contacting said brine with a strong base anion exchange resin in an elongated channel, said brine and resin flowing in the same direction under conditions of turbulent flow and then separating the resulting bromine-laden resin from the residual water phase and recovering the bromine from the bromine-laden resin.

2. The process of claim 1 wherein said bromide-containing brine contains 10 to 1000 p.p.m. bromide.

3. The process of claim 1 wherein the acidification of the brine, the oxidation of its bromide content to bromine, the contacting of the brine with the resin, and the separation of the bromine-laden resin from the residual water phase are conducted substantially simultaneously in a continuous manner.

4. The process of claim 3 wherein said bromide-containing brine contains 10 to 1000 p.p.m. bromide.

References Cited in the file of this patent
UNITED STATES PATENTS

| | | |
|---|---|---|
| 1,916,094 | Curtin | June 27, 1933 |
| 1,917,762 | Grebe et al. | July 11, 1933 |
| 2,945,746 | Shaw | July 19, 1960 |